United States Patent [19]

Schultz

[11] Patent Number: 5,392,691
[45] Date of Patent: Feb. 28, 1995

[54] STONE SHIELD FOR AIR BRAKE ACTUATOR WITH WELDED YOKE

[75] Inventor: Thomas O. Schultz, Madison Heights, Mich.

[73] Assignee: Indian Head Industries, Inc., Charlotte, N.C.

[21] Appl. No.: 87,659

[22] Filed: Jul. 6, 1993

[51] Int. Cl.⁶ .............................................. F16J 15/18
[52] U.S. Cl. .......................................... 92/168; 92/63; 277/237 A; 277/215; 277/DIG. 4
[58] Field of Search ............ 92/62, 63, 130 R, 130 A, 92/96, 101, 168, 168 B; 277/DIG. 4, 237 A, 212 C, 215

[56] References Cited

U.S. PATENT DOCUMENTS

| | | | |
|---|---|---|---|
| 4,116,115 | 9/1978 | Gross et al. | 92/168 B |
| 4,222,310 | 9/1980 | Garrett et al. | 92/168 B |
| 4,329,853 | 5/1982 | Kittle et al. | 277/DIG. 4 |
| 4,419,923 | 12/1983 | Kasahara | 92/168 B |

FOREIGN PATENT DOCUMENTS

| | | | |
|---|---|---|---|
| 1197976 | 12/1959 | France | 92/63 |
| 1921622 | 2/1971 | Germany | 92/63 |
| 2118326 | 11/1971 | Germany | 92/63 |
| 2000225 | 1/1979 | United Kingdom | 92/63 |
| 2058248 | 4/1981 | United Kingdom | 272/212 C |

Primary Examiner—Thomas E. Denion
Attorney, Agent, or Firm—Howard & Howard

[57] ABSTRACT

A shield for a brake actuator has a bore closely surrounding a piston rod which is welded to a yoke. The shield is formed with a plurality of slits that allow portions of the shield between the slits to bend radially outwardly and allow the yoke to move through the bore. Thus, the invention allows the use of a yoke which is welded to a piston rod, and also allows the use of a shield which closely surrounds the piston rod.

21 Claims, 3 Drawing Sheets

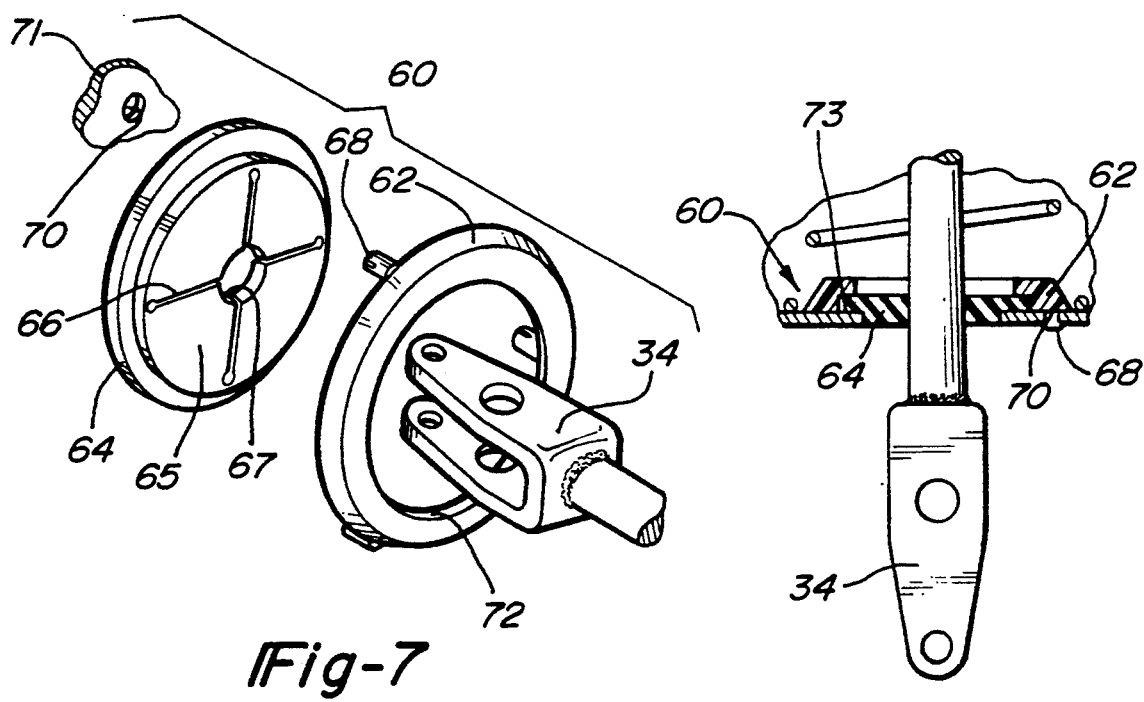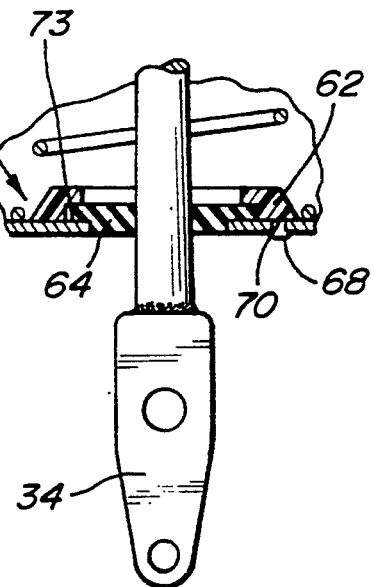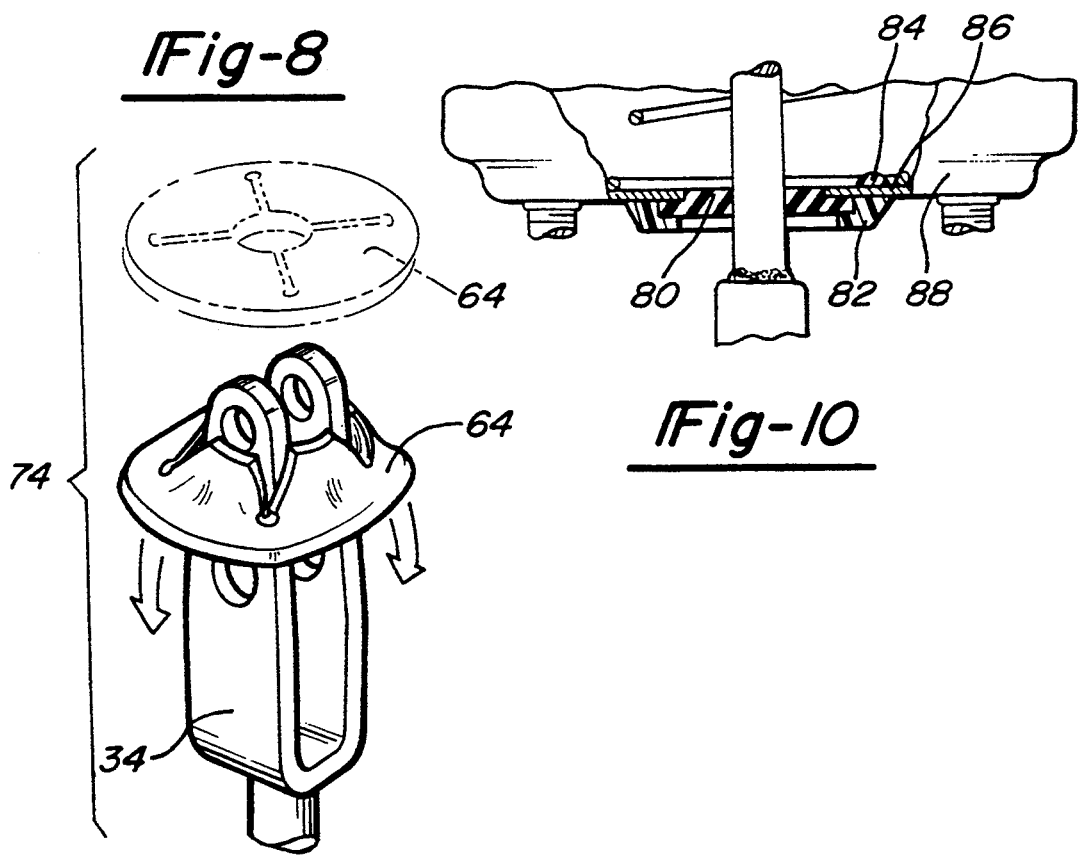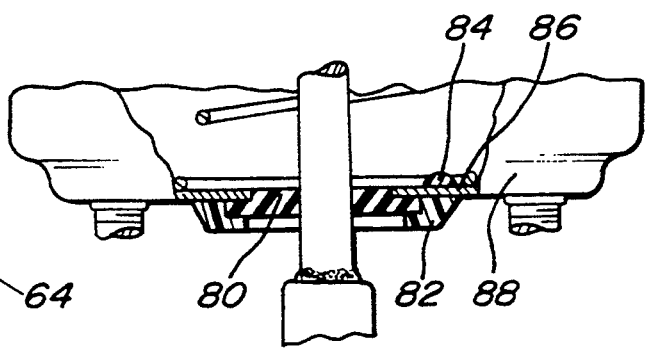

STONE SHIELD FOR AIR BRAKE ACTUATOR WITH WELDED YOKE

BACKGROUND OF THE INVENTION

This application in general relates to a stone shield which may be used with a welded yoke in an air brake actuator.

In the prior art, air brake actuators incorporate a piston moveable within an air chamber to actuate a brake. The piston includes a piston rod which moves through an opening in the chamber housing, and which has a yoke threadably connected to one end of the piston rod. The yoke is attached to an actuation structure for a brake. The prior art has typically utilized a stone shield which has a bore that closely circumscribes the outer peripheral surface of the piston rod to ensure that debris, rocks, etc., do not enter the chamber housing between the opening and the outer peripheral surface of the piston rod. Such shields have proven quite beneficial. Typically, the piston rod and piston are placed within the chamber housing, and the piston rod is inserted through the stone shield. The yoke is then threaded to the end of the piston rod which extends through the opening.

In another prior brake actuator, a yoke is welded to the piston rod. The use of a welded yoke reduces manufacturing costs, provides a more secure connection between the yoke and the piston rod, and simplifies the attachment of the brake actuator to the brake. A piston incorporating a yoke welded to the piston rod cannot be utilized with a stone shield, however, since the yoke has a larger diameter than the piston rod. The yoke thus cannot pass through the bore in the stone shield, which must approximate the outer diameter of the piston rod. The other end of the piston rod is attached to the piston, which typically has an even greater diameter than the yoke. Thus, the prior art has not successfully incorporated stone shields and welded yokes into a single brake actuator assembly.

SUMMARY OF THE INVENTION

In a disclosed embodiment of this invention, a stone shield is formed of relatively resilient material, and has a bore surrounding the piston rod which may expand to allow passage of the yoke. In one disclosed embodiment of this invention, the stone shield is formed of a relatively strong plastic having at least one slit extending from the bore towards the outer peripheral surface of the stone shield. This slit allows the diameter of the bore to expand to allow passage of the yoke. In a most preferred embodiment of the present invention there are a plurality of such slits.

In another feature of the present invention, a holding portion secures the stone shield to the chamber housing. The stone shield and holding portion may be positioned within the housing, or outwardly of the housing. Further, the shield and holding portions may be formed separately, or may be integrally formed.

In a method according to the present invention, the yoke is forced through the stone shield and pivots portions of the stone shield between the slits radially outwardly such that the yoke may pass through the stone shield. The piston is initially assembled by welding the yoke to one end, and the piston head to the other end of the piston rod. The yoke is then forced through the bore in the stone shield, and extends through the opening in the cylinder wall.

These and other features of the present invention can be best understood from the following specification and drawings, of which the following is a brief description.

BRIEF DESCRIPTION OF THE DRAWINGS

FIG. 7 is an assembly view of a second embodiment of the present invention;

FIG. 8 shows the assembly of the second embodiment;

FIG. 9 is a cross-sectional view through a second embodiment; and

FIG. 10 if a cross-sectional view through a third embodiment.

DETAILED DESCRIPTION OF THE PREFERRED EMBODIMENT

Figure 1:
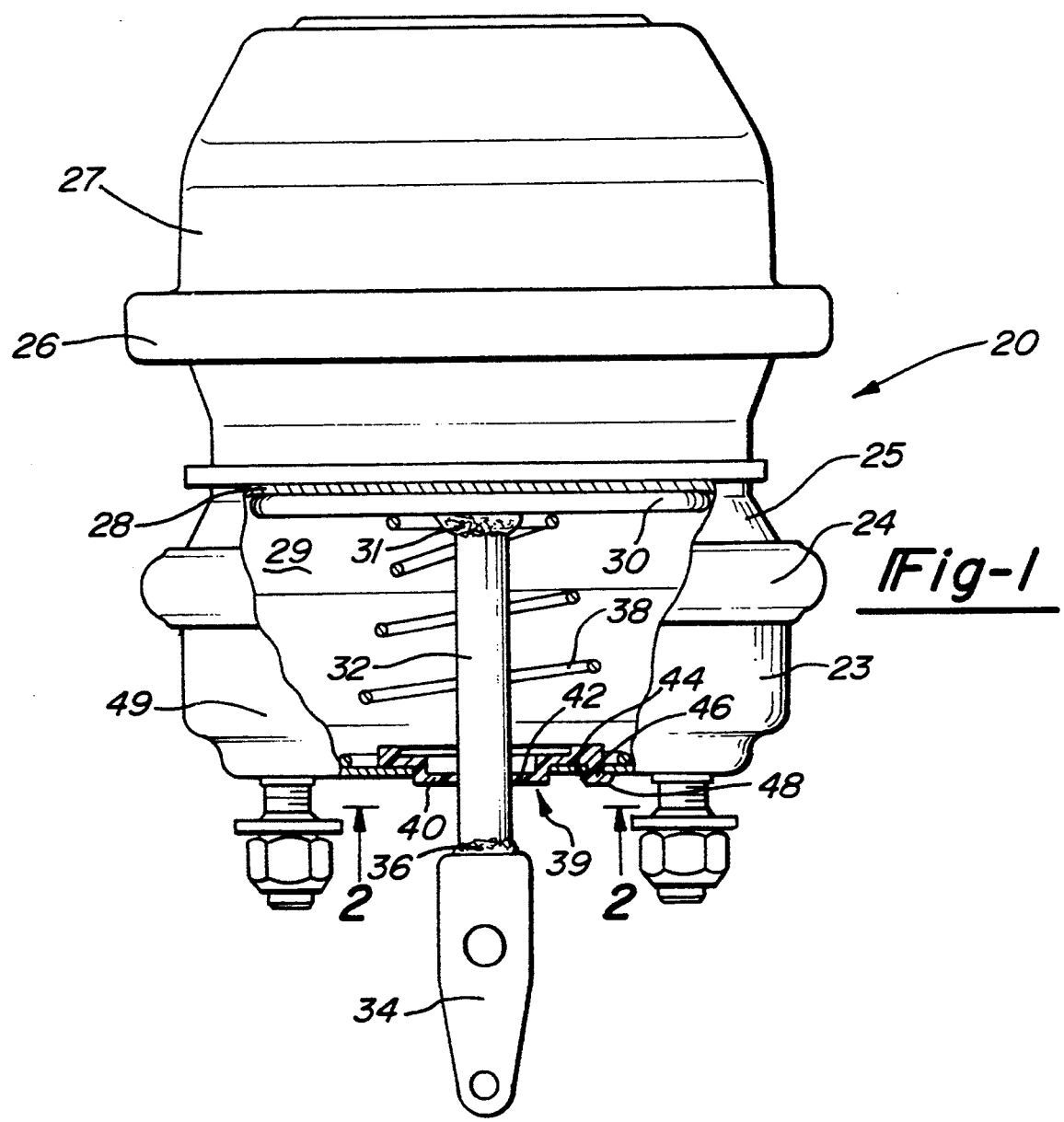
FIG. 1 is a partially cut away view of a brake actuator incorporating the present invention.

FIG. 1 shows a brake actuator 20 incorporating a service chamber housing 23 connected by a clamp 24 to flange case 25. Flange case 25 is connected by a clamp 26 to a brake head 27. As is known in the art, a diaphragm 28 is positioned in a chamber 29 defined between spring chamber housing 23 and flange case 25 and reciprocates with a piston 30 welded at 31 to a piston rod 32 which is connected to a yoke 34. Yoke 34 is adapted to be connected to a brake assembly, and movement of the piston rod 32 inwardly and outwardly of the chamber 29 causes the yoke 34 to actuate the brake. As shown, a weld joint 36 connects the yoke 34 to piston rod 32. A spring 38 biases piston 30 into chamber 29. A stone shield assembly 39 incorporates a shield 40 having an inner peripheral surface defining a bore 42 closely surrounding the outer peripheral surface of piston rod 32. A holding member portion 44 has locking tabs 46 extending through openings 48 in an end wall 47 of the housing 23. In this embodiment, shield 40 and holding member 44 are integrally molded. In this way holding member 44 is secured to housing 23, and holds shield 40 to the housing 23.

As shown in FIG. 1, an opening 49 is formed in the end wall 47, and has a dimension which is slightly greater than the outer dimension of yoke 34. The diameter of the bore 42 is less than the outer diameter of the yoke 34 at least in some dimensions. In addition, the diameter of piston 30 is greater than the diameter of bore 42, opening 49, or yoke 34.

Figure 2:
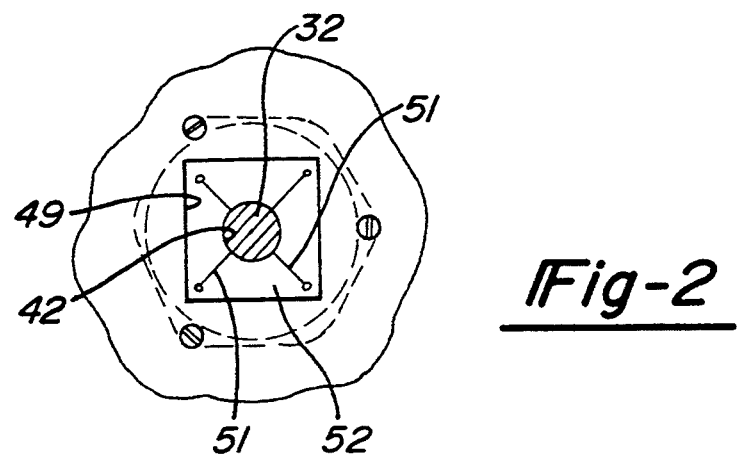
FIG. 2 is view along line 2—2 as shown in FIG. 1.

As shown in FIG. 2 shield 40 has a plurality of slits 51 extending radially outward from bore 42. Note that the slits do not extend to the outer peripheral edge of shield 40. Opening 49 is square as is the cross-section of yoke 34.

Figure 3:
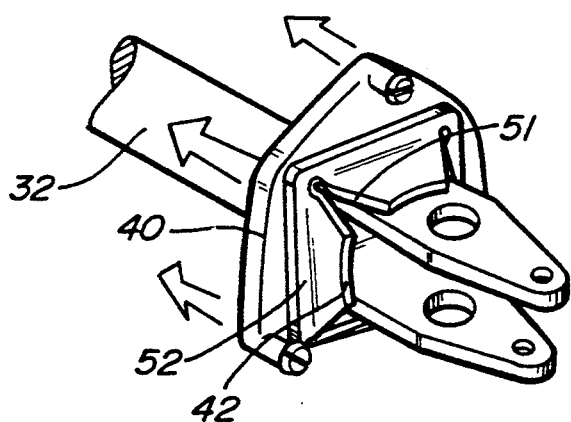
FIG. 3 shows an assembly step according to the present invention.

As shown in FIG. 3, shield 40 has a plurality of slits 51 extending radially outwardly from the bore 42. Portions 52, defined between slits 51, bend to allow passage of yoke 34 through bore 42.

Figure 4:
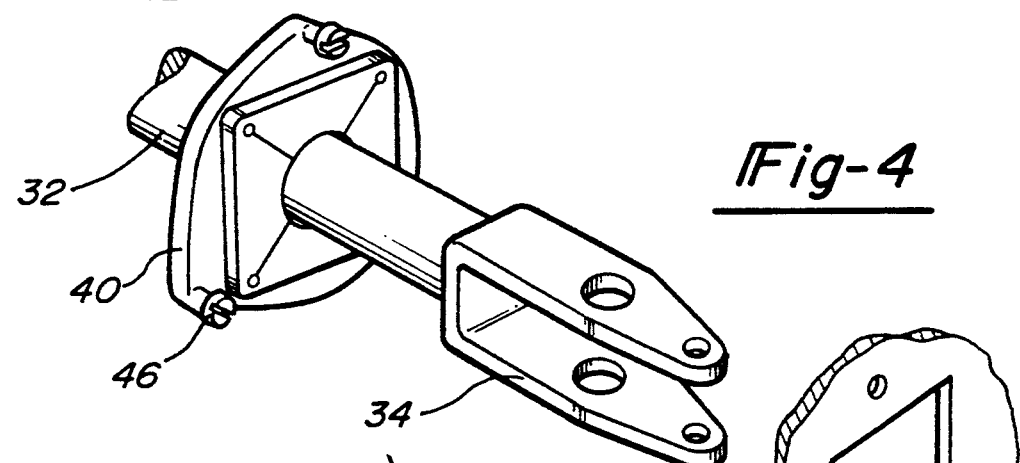
FIG. 4 shows an assembly step according to the present invention.

As shown in FIG. 4, shield 40 is assembled to rod 32 and yoke 34 may now be inserted through the opening 49 in the housing 23. Locking tabs 46 extend through openings 48. As shown, opening 49 and the outer dimensions of yoke 34 are both roughly rectangular and of the same approximate dimensions. Thus, yoke 34 may pass through the opening 49.

As is also shown, the shield 40 may be assembled to the piston rod 73 prior to the shield 40 being attached to housing 23. Alternatively, yoke 34 may also pass through a shield, after the shield has been preassembled to the housing 23.

Figure 5:
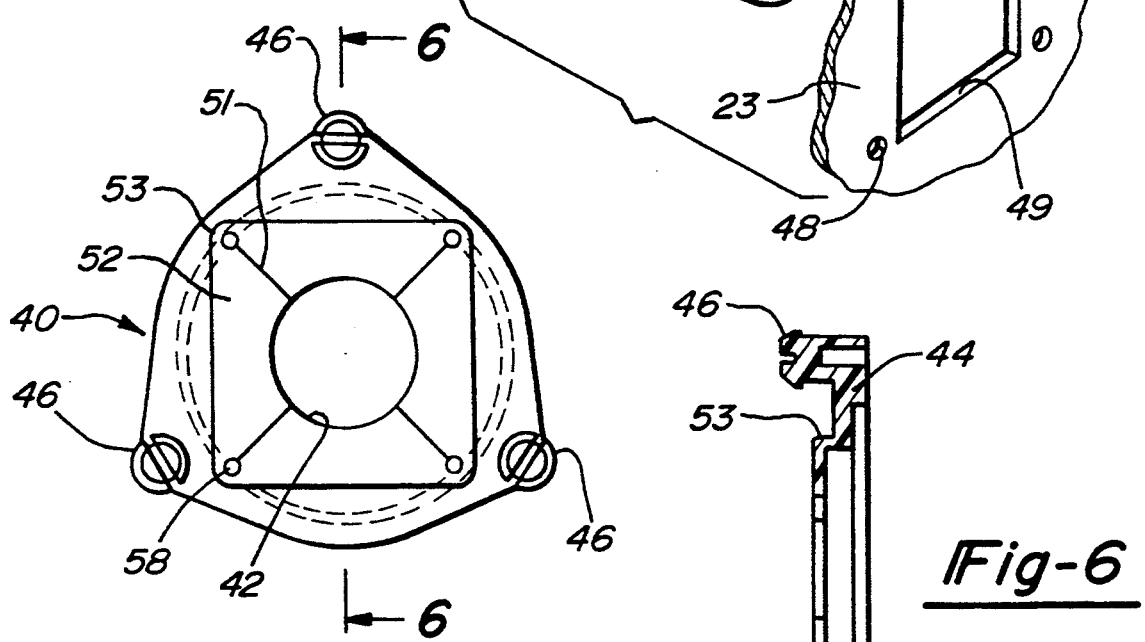
FIG. 5 is an end view of a shield according to a first embodiment of the present invention.

As shown in FIG. 5, shield 40 incorporates a portion 53 which is to be received in opening 49. Portion 53 includes the slits 51 and the portions 52 which bend to allow passage of yoke 34. As also shown, circular openings 55 are formed at the ends of slits 51 to facilitate the bending of the sections 52. As shown, there are three equally spaced locking tabs 46.

Figure 6:
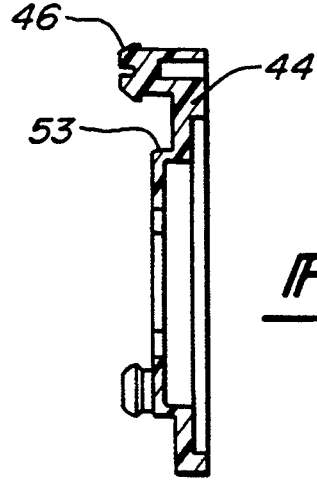
FIG. 6 is a cross-sectional view along line 6—6 as shown in FIG. 5.

As shown in FIG. 6, the portion 53, the holding portion 44, with locking tabs 46, are all integrally molded. Each locking tab 46 includes an enlarged conical head portion, which extends through the openings in the housing, and a cylindrical shank. As shown a slit is formed in the head to facilitate insertion through the opening in the housing which extends through the openings in the housing.

As shown in FIG. 7, a second embodiment shield assembly 60 incorporates a separate holding member 62 which holds a separate shield member 64. Portion 65 between adjacent slits 66 bend outwardly to expand the size of a central bore 67 and allow passage of a yoke 34. Holding portion 62 includes pins 68 which are received in holes 70 in a housing member 71. As also shown, an opening 72 in holding member 62 is of a relatively large diameter such that yoke 34 passes easily through opening 72.

As shown in FIG. 8, when it is desired to move yoke 34 through shield 60, an action such as shown at 74 is utilized. The shield 64 is brought downwardly onto yoke 34, and sections 65 pivot radially outwardly. As shown, the slits have circular openings adjacent there radially outer ends to facilitate such bending and prevent ripping of the shield.

As shown in FIG. 9, the assembled second embodiment 60 includes holding member 62 with pins 68 received in openings 70. As shown, a lip portion 73 on the holding member 62 extends radially inwardly over a portion of the shield 64 holding shield 64 to the housing. In one preferred embodiment, the lip 73 extends radially inwardly over at least a portion of the slits 66.

As shown in FIG. 10, a shield 80 may be positioned outwardly of the housing 88. In such an embodiment, holding member 82 would preferably be positioned outwardly of the shield 80, and pins 84 preferably extend into openings 86 in the housing 88.

Preferably, the holding members are formed of a material which is more rigid than the material used to form the shield. The shield should have some resilience such that it returns to its original shape after passage of the yoke. Preferably, suitable plastics are used to form both members.

In a preferred embodiment, the holding portion and the shield portion are integrally molded a relatively flexible resilient, wear resistant thermoplastic, such as from a polyester base urethane material. In a preferred embodiment, the central bore in the shield has a diameter of 0.65 inch, for a piston rod having a diameter of $\frac{1}{2}$ inch resulting in a clearance of 0.025 inch. Preferably, the clearance is maintained below 0.1 inch. With the same construction, the yoke has a largest outer diameter of 1 inch.

Preferred embodiments of this invention have been disclosed, however, a worker of ordinary skill in the art would recognize that certain modifications would come within the scope of this invention. For that reason, the following claims should be studied in order to determine the true scope and content of this invention.

What is claimed is:

1. A brake actuator comprising:
   a chamber defined by at least a first housing member including an opening;
   a piston received in said chamber, and having a piston rod extending through said opening and out of said chamber;
   a yoke connected to said piston rod at a location outwardly of said chamber, said piston rod having a first outer dimension, said yoke having a second outer dimension greater than said first outer dimension; and
   a shield received in said opening and having a bore of a diameter slightly greater than said first outer dimension such that said bore closely surrounds said piston rod, and said bore being capable of expanding radially outwardly such that said yoke may pass through said bore.

2. A brake actuator as recited in claim 1, wherein said shield includes at least a first slit extending radially outwardly from said bore, said slit allowing said bore to expand to allow passage of said yoke, 3. A brake actuator as recited in claim 2, wherein said slit does not extend to the outer peripheral surface of said shield.

4. A brake actuator as recited in claim 2, wherein there are a plurality of said slits extending radially outwardly from said bore.

5. A brake actuator as recited in claim 4 wherein a holding member secures said shield to said first housing member.

6. A brake actuator as recited in claim 5, wherein said holding member includes locking tabs which extend into openings in said first housing member to secure said holding member to said first housing member.

7. A brake actuator as recited in claim 6, wherein said holding member having a lip extending radially inwardly over a portion of said shield to hold said shield to said first housing member.

8. A brake actuator as recited in claim 5, wherein said shield and said holding member are integrally formed.

9. A brake actuator as recited in claim 5, wherein said shield and said holding member are received within said chamber.

10. A brake actuator as recited in claim 5, wherein said holding member and said shield are received outwardly of said chamber.

11. A brake actuator as recited in claim 5 wherein said slits have enlarged circular portions at radially outer ends.

12. A brake actuator as recited in claim 6 wherein said locking tabs have an enlarged conical head which passes through said openings and a relatively small shank connecting said head to said holding member.

13. A brake actuator as recited in claim 1, wherein said opening in said housing has a dimension which is greater than the dimension of said yoke such that said yoke may pass through said opening freely.

14. A brake actuator as recited in claim 1, wherein said yoke is welded to said piston rod.

15. A brake actuator as recited in claim 1, wherein said opening in said housing has a rectangular Cross-section, and said shield has a rectangular outer periphery received in said opening, and an outer cross-section of said yoke is also approximately rectangular.

16. A method of assembling a brake actuator comprising the steps of:
  (1) providing a piston by connecting a piston to a piston rod at a first end, and welding a yoke to a second end of said piston rod, wherein said yoke and said piston have greater outer diameters than said piston rod;
  (2) inserting one of said piston and said yoke through a shield wherein the shield is constructed to have a bore of an inner diameter slightly greater than the outer diameter of said piston rod, said bore being radially expandable to allow passage of said one of said yoke and said piston head; and
  (3) securing said shield to a housing for a brake actuator such that said piston is received within said housing, said piston rod extending through said bore in said shield and outwardly of said housing, and said yoke being received outwardly of said housing.

17. A method as recited in claim 16, wherein said yoke is moved through said shield.

18. A method as recited in claim 17, wherein said shield is formed with a plurality of slits such that portions of said shield between said slits bend radially outwardly to allow passage of said yoke.

19. A stone shield for use with a brake actuator comprising:
  a shield body having a central bore of a first diameter selected to closely circumscribe the outer diameter of a piston rod in a brake actuator; and
  at least one slit extending radially outwardly from said bore and through the thickness of said shield, such that said slit facilitates the radial bending of portions of said shield to allow a member attached to the piston rod which has a larger outer dimension than the piston rod to pass through said bore by expanding the inner diameter of said bore.

20. A shield as recited in claim 19, wherein there are a plurality of said slits extending radially outwardly from said bore.

21. A shield as recited in claim 19, wherein said first diameter being slightly greater than the outer diameter of the piston rod.

* * * * *

UNITED STATES PATENT AND TRADEMARK OFFICE
CERTIFICATE OF CORRECTION

PATENT NO. : 5,392,691
DATED : February 28, 1995
INVENTOR(S) : Thomas O. Schultz It is certified that error appears in the above-indentified patent and that said Letters Patent is hereby corrected as shown below:

In Claim 2, column 4, line 32 of the Patent, after "yoke" delete "," and insert --.--

In Claim 15, column 5, line 4 of the Patent, after "rectangular" delete "Cross" and insert --cross--

In Claim 16, column 5, line 24 of the Patent, after "for" delete "a" and insert --said--

Signed and Sealed this

Sixteenth Day of May, 1995

BRUCE LEHMAN

*Attest:*

*Attesting Officer*  *Commissioner of Patents and Trademarks*